May 25, 1965  C. H. VAN HARTESVELDT ETAL  3,185,073
APPARATUS FOR PREVENTING BELT DISTORTION
Filed Feb. 12, 1963  2 Sheets-Sheet 1

INVENTOR.
CARROLL H. VAN HARTESVELDT
BUDDY D. WAHL
BY
OLSEN & STEPHENSON

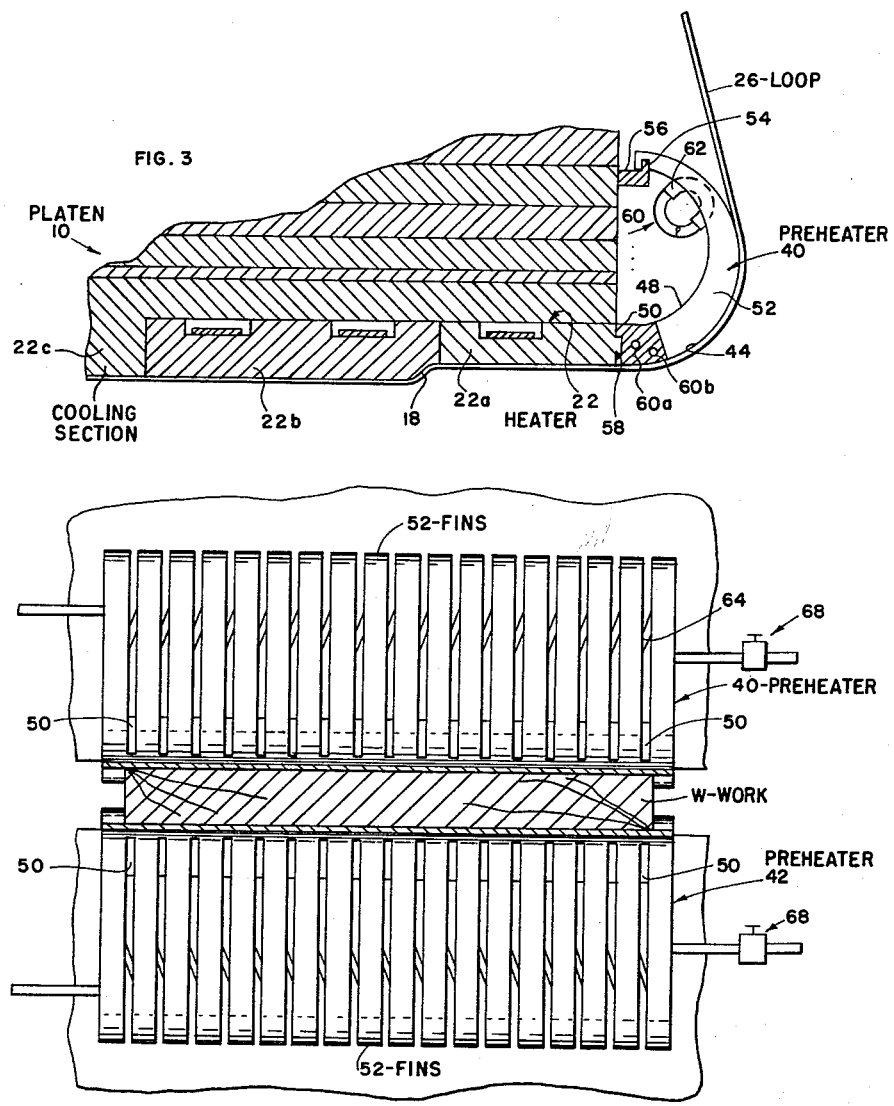

United States Patent Office 3,185,073
Patented May 25, 1965

3,185,073
APPARATUS FOR PREVENTING BELT DISTORTION
Carroll H. Van Hartesveldt and Buddy D. Wahl, Toledo, Ohio, assignors to Hoover Ball and Bearing Company, Saline, Mich., a corporation of Michigan
Filed Feb. 12, 1963, Ser. No. 258,085
6 Claims. (Cl. 100—93)

The present invention relates to improvements in a mechanism for applying a force to the surface of a product as it passes through the mechanism being carried by a traveling belt.

More particularly the invention relates to a mechanism embodying a pair of heated platens with opposed surfaces with at least one surface having a step. A workpiece is carried between the surfaces of the platens by a pair of endless traveling belts which slide over the platen surfaces and the workpiece is compressed between the platens. This type of mechanism may be employed in forming case hardened layers on the surfaces of wood workpieces as disclosed in our copending application U.S. Serial No. 70,498, filed November 21, 1960, now U.S. Patent No. 3,159,526.

The stress on the thin steel belts which draw the workpiece between the platens and over the steps is substantial and approaches the maximum stress allowable in tension without reaching the point of failure. These stresses are due to the forces required in drawing the workpiece between the platens and in bending as the belt material passes over the step. We have discovered a further factor requiring consideration, which is thermal distortion. This has been discovered to be a significant factor and the principal thermal stress that occurs is in shear. If the thermal forces are not recognized and compensated for, they can cause failure of the belts. In addition to the shear and tensile forces from the thermal gradients which occur as the belt is rapidly heated upon coming into contact with the heated platen, there are tensile forces from belt tension and work load as well as bending forces at the location where the belt turns to enter the space between the platens and at the platen step. For the belt to have a long operating life it is necessary that no combination of forces exceed the fatigue limit of the belt.

A feature of the present invention is the provision of a method and mechanism for minimizing the thermal distortion of the belt by heating the belt to a temperature substantially equal to or higher than the predetermined preheat temperature that the belt attains against the platen, and to perform this heating step over a relatively long curved path at a controlled temperature gradient.

Accordingly an object of the present invention is to provide a mechanism and method for operation in a device of the type above described wherein the traveling carrier belt is capable of a long operating life and wherein the stresses are maintained at a minimum and wherein particularly the thermal stress factors are substantially avoided.

A still further object of the invention is the provision of a force applying mechanism of the type described wherein the traveling carrier belts can be made at a minimum thickness and at thicknesses less than that heretofore possible since stresses are reduced.

A further object of the invention is to provide a mechanism for applying operational forces to the surface of a moving product carried by a traveling belt with a belt preheat mechanism which increases over a relatively long gradient the temperature of the belt prior to its being fully heated and bent in the processing equipment and prior to its being confined between the surfaces of the processing equipment.

Other objects, advantages and features will become more apparent with the disclosure of the preferred embodiment of the invention in the specification, claims and drawings, in which:

FIGURE 3 is an enlarged fragmentary sectional view of a portion of the mechanism of FIG. 1; and FIGURE 4 is an enlarged fragmentary front elevational view of a portion of the mechanism of FIG. 1.

Figure 1:
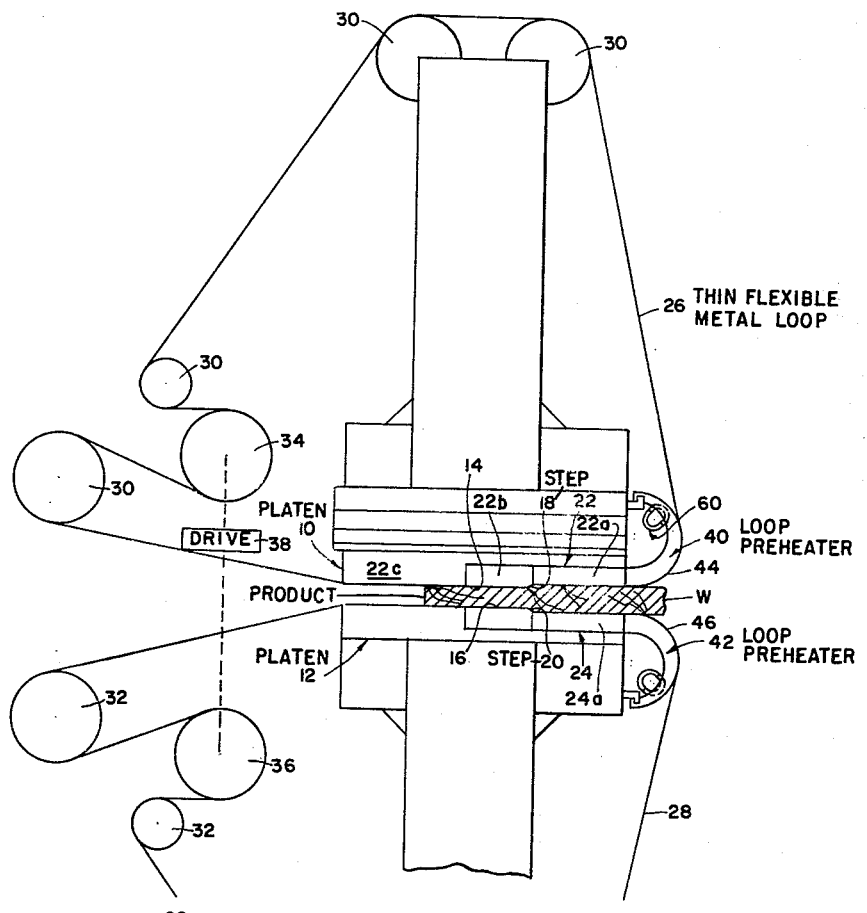
FIGURE 1 is a side elevational view shown in somewhat schematic form, with portions removed for clarity, of a mechanism constructed in accordance with the principles of the present invention.
Figure 2:
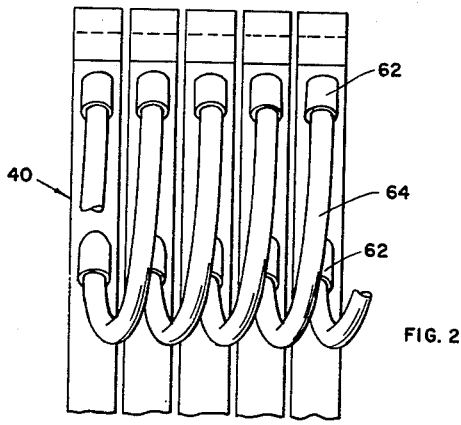
FIGURE 2 is an enlarged fragmentary rear elevation of a belt preheat mechanism constructed in accordance with the principles of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The drawings illustrate opposed platens 10 and 12 with facing surfaces 14 and 16 provided with steps 18 and 20 for applying a pressure to the surface of a workpiece W. The platens 10 and 12 are provided with heaters 22 and 24. The steps 18 and 20 may be employed for applying a pressure to the workpiece W for various purposes, and in a preferred type of arrangement the workpiece W is of a cellular material such as cellulose or wood and the steps have a predetermined length and slope so as to apply a pressure which will exceed the yield point of the material at its surface and effect a permanent surface compression.

Since each of the platens 10 and 12 is similar in construction, FIG. 3 which is devoted to greater detail of the platen and associated mechanism illustrates only the upper platen 10. The heater 22 includes a preheat section 22a and a heat curing section 22b. The temperature of the heating sections is selected dependent upon the factor of speed of travel of the workpiece W in order to raise the temperature of the surface to a predetermined degree. After the workpiece W passes the heater sections it is rapidly cooled by a cooling section 22c. The workpiece W is carried through between the platens 10 and 12 by looped carrier belts 26 and 28, and the heaters 22 and 24 of source heat the belts. The belts pass over guide rolls 30 and 32 and are wrapped around driving rolls 34, 36 rotated by a suitable drive 38. Suitable lubricating means is provided between the belts and platen surfaces.

Belt preheaters 40 and 42 are formed as extensions of the platens 10 and 12 to provide entry or lead-in portions 44, 46 having rounded front entrance surfaces or noses, and the belts 26 and 28 pass over these rounded noses. Thus the belts pass through paths which include entry curved portions 44, 46 and pressurized planar portions formed by the stepped surfaces 14 and 16. The lead-in portions 44 and 46 provide extensions to increase the area of contact between the workpiece and the belts so that there is sufficient frictional force between the belts and workpiece to drag the workpiece through between the platens. The lead-in portions 44 and 46 are heated, as will be described, and form part of the preheat portion which in conjunction with preheat sections 22a and 24a preheats the workpiece W.

As will be noted from the foregoing, the belts 26 and 28 are bent around the curvature of the entry surfaces 44 and 46, and are thereafter confined by the opposing pressures of the workpiece and the surfaces of the platens as soon as they enter the horizontal portion of their travel along the stepped surfaces 14 and 16. They are thus confined when they pass beneath the preheat sections 22a and 24a.

The belts 26 and 28 are formed of a thin lightweight flexible metal of sufficient thickness to withstand the stresses imposed thereon, both by the forces of drawing the workpiece over the platen surfaces and steps, and by the temperature changes.

The basic problem of distortion of a metal member with heat can be illustrated by a cylindrical rod which is placed between two immovable walls and heated. The rod would normally grow in length if it were not confined, and is thus under compression. If it is heated sufficiently so that the compression, which is equal to the difference between its free unrestrained length and its actual length, would exceed its elastic limit, then permanent distortion would take place in the rod. In this event the rod would be shorter than the distance between the confining walls when it was subsequently cooled.

Applying the above principles to the belts of the drawings, the following calculations apply to determine the temperature increment which will cause failure in a confined piece of 18-8 stainless steel belt material.

Physical properties of the stainless steel:
Ultimate strength—$S_{ult.}=155{,}000$ lbs. per sq. in.
Coefficient of expansion—$k=9.8\times10^{-6}$/in. per ° F. with change in temperature.
Modulus of elasticity—$E=29{,}000{,}000$ lbs. per sq. in.

General formulae:

$$\text{Deformation}=\frac{\text{pounds}\times\text{length}}{\text{Area}\times E}$$

$$\text{Deformation}=\Delta T\times k\times\text{length}$$

At the yield point $$\frac{S_y\times\text{length}}{E}=\Delta T\times k\times\text{length}$$

Substituting values, $$\frac{155{,}000}{29{,}000{,}000}=\Delta T\times 9.8\times 10^{-6}$$

$$\Delta T=\frac{155{,}000\times 1{,}000{,}000}{29{,}000{,}000\times 9.8}$$

$$T=545°\ F.$$

In the case of a thin steel belt as used in the continuously operating machine, the principal thermal stress that occurs is in shear and the forces that prevent the distortion (wrinkling or fluting) which would otherwise relieve the stress are those resulting from bending around a cylindrical shape at right angles to the belt motion.

Assuming the lead-in curving portions 44 and 46 to be heated to a temperature of 350° to 400° F. at the hottest line, depending on molding requirements, and assuming the lead-in surface to have a 2″ radius, the thin belts heat up very rapidly and are bent as they pass over the cylindrical surfaces. Because the belts come up to temperature very quickly, the thermal gradient is steep. The steeper the gradient the higher the stress.

Calculations show that a 300° F. temperature gradient along a 0.66″ length of 36″ wide belt will produce a tensile stress of 100,000 pounds per square inch (yield strength of 18-8, full hard stainless steel) in tension. The same temperature gradient must be extended to 6.5″ to limit the shear stress to 100,000 pounds per square inch.

In addition to the shear and tensile forces from the thermal gradients there are tensile forces from belt tension and work load as well as bending forces at the lead-in curvatures 44 and 46 and at the steps 18 and 20. For the belts to have a long operating life it is necessary that no combination of forces exceed the fatigue limit of the steel used. In our copending application Serial No. 70,498 an analysis is presented of the stresses encountered in the belts due to factors other than heating.

In the present arrangement the thermal distortion of the belts 26 and 28 is minimized by preheating the belts up to or higher than the temperature to which they are subjected upon entering the platens. This is accomplished by the heating means shown in the form of the belt preheaters 40 and 42. These preheaters are constructed and arranged so that the lead-in curvatures 44 and 46 are substantially greater than the 2″ radius referred to above and to produce a gradual increase in temperature as the belts bend around the lead-in curvatures 44 and 46. For this purpose the belts are brought to a temperature in the order of 350 to 400° F., which is the same or slightly higher than the temperatures of the heaters in the platens 22a and 24a.

The belt preheaters 40 and 42 are constructed essentially the same, and therefore, only belt preheater 40 will be described in detail. The belt preheater 40 has a cast copper body member 48 which defines the lead-in curvature 44. The body member 48 includes the integral base portion 50 from which the arcuate fins 52 emanate. The fins 52 have suitable support elements, such as the notches 54, at their free ends for connection with the supporting bracket 56 which is suitably connected to the frame of the illustrated mechanism. The connection at 54, 56 is such that thermal expansion and contraction of the preheater 40 is readily accommodated. The base portion 50 is also supported on the illustrated mechanism by suitable means such as the tongue and groove 58 and by suitable bolts, or the like (not shown), which allow lateral expansion of the preheater 40.

Heating of the preheater 40 is accomplished by a plurality of thermostatically controlled electric resistance heaters 60a and 60b. These may be controlled to give the temperature desired for the belt as it passes to section 22a. To provide the gradual downward temperature gradient from this line line in the direction opposite to belt motion, a cooling means 60 is provided near the free ends of the fins 52 to establish the temperature of the belt at a low level as the belt enters the curved path 44. The temperature gradient between the point at which the belt enters path 44 and the location nearest heaters 60a and 60b is established by the rate in reduction of cross-sectional area of the fins 52 from their base nearest location 50 to the first point of contact of the belt. This reduction in cross-sectional area increasingly restricts heat flow toward the cooling means thereby establishing and maintaining the temperature gradient.

The alternative methods of thermostatically controlling a succession of heaters in adjacent, insulated sections have the disadvantages of mechanical complexity, a multiplicity of heating elements with a temperature controller for each and step-wise temperature increments instead of a smooth gradient.

The cooling means 60 includes a plurality of U-shaped tubes 62 which are cast in the fins 52, and a plurality of connecting tubular coil sections 64 which together with tubes 62 provide a continuous passageway for the flow of cooling water. The tubular coil sections 64 have flexible properties to facilitate thermal expansion and contraction of the preheater 40 in the directions of the arrows 66. The rate of flow of the cooling water may be controlled manually by suitable valves 68, FIG. 4, or suitable thermostatically controlled means may be employed if automatic control is desired.

As indicated above, the belt preheaters 40 and 42 are operated so that the belts 26 and 28 are preheated up to or higher than the temperature to which they are subjected upon entering the platens 10 and 12. Preheating the belts also prevents excessive thermal stress in the belts just outside the workpiece being molded, or in other words, where the belts are confined. When the belts enter the platens cold, they are clamped to the workpiece being molded and physically held to the cold dimensions of the workpiece even though they are subsequently heated to platen temperatures. However the belt outside the workpiece is not held, so distortional forces come into play as the belt outside the piece comes up to temperature and is free to move while the area clamped is not. When the belts are heated before being clamped subsequent distortion is minimized.

In operation, the belts 26 and 28 are driven in rotation so that they travel continuously over the surfaces 14 and 16 of the platens 10 and 12. The belts are gradually preheated by the preheaters 40 and 42 while they are gradually being bent around the rounded surfaces of fins 52 prior to entering the platens and thermal distortions and stresses of the belts are thereby substantially avoided.

Thus it will be seen that we have provided an improved mechanism which meets the objectives and advantages above set forth, and which makes it possible to provide an improved product in the provision of belts of less thickness, and provides an improved machine in extending the operating life of the belts.

We claim:

1. In a mechanism for applying a force to the surface of a product, the combination comprising a platen having a planar pressure surface with a step therein, means for heating said platen, a traveling sheet of thin flexible metal movable over the surface of the platen for carrying the product past the platen, means for holding the product against the sheet, and means for heating the sheet before it is compressed between the platen and product avoiding stress produced by temperature increase of the belt due to heat from the platen with the belt being held between the product and platen.

2. A mechanism for forming a case hardened surface on a cellular product comprising a platen having a pressure surface with a step of a predetermined length and slope sufficient to apply a local pressure to the surface of the product exceeding its yield point, means for heating said platen, an endless traveling belt of thin flexible metal extending over a path having a curved portion turning beneath the platen and having a product engaging portion passing over the platen surface, means for holding the product against the belt, and belt preheat means positioned for applying heat to the belt to increase its temperature at a controlled gradient while it travels through said curved portion of the path.

3. In a machine for forming a surfaced board, first and second opposed compressing platens having sloping compressing surfaces for engaging limited areas of a wood workpiece on opposite surfaces thereof and compressing the wood surfaces beyond their elastic limit, first and second endless loops of thin flexible metal having a high tensile strength and positioned to move over the respective surfaces of said first and second platens, means for driving each of said loops so that the workpiece will be drawn between the platens by frictional engagement with the surfaces of the workpiece, means for heating the platens, and means for heating the metal of said loops at a location advanced from said platens so that the temperature of the metal of the loops will be increased before being held between the platens and workpiece.

4. In a mechanism for applying a force to the surface of a product, the combination comprising a platen having a pressure surface with a step therein to apply a pressure to the surface of the product, an endless traveling belt of thin flexible metal passing over the stepped surface of the platen for carrying a product past said stepped surface, means for holding the product against the belt, means for heating said platen to heat the product to a predetermined temperature whereby the belt is heated to a predetermined temperature as it passes over the surface, and means for applying heat to the belt before it reaches the platen and heating it to a temperature substantially equal to said predetermined temperature to which the belt will be heated by the platen.

5. In a mechanism for applying a force to the surface of a product, the combination comprising a heated platen having a pressure surface with a step therein, a looped traveling thin flexible lightweight metal belt positioned for passing over the surface of the platen for carrying the product past the platen, means for holding the product against the belt, and means for applying heat energy to the belt at a location before it reaches the platen surface and heating it to a temperature of 350° to 400° F.

6. In a machine for forming a product in sheet form, first and second stationary platens having opposed compressing surfaces for engaging opposite surfaces of the product, first and second endless loops of thin flexible metal having a high tensile strength and positioned to move over the respective surfaces of said first and second platens, means for driving each of said loops over the platen surfaces so that the product will be drawn between the platens by frictional engagement of the loops with the surfaces of the product, means in said platens for heating the platens and thus the portions of the loops between the platens, the portions of said loops not between said platens being exposed to conditions which tend to lower the temperature thereof so that the portions of said loops advancing toward said platens are below the temperature of the portions of said loops between said platens, and loop pre-heat means in heat transfer relationship with said loops at locations in advance of said platens for applying heat to the loops at a controlled temperature gradient to increase the temperature of the metal of the loops at such locations to approximate the temperature of those portions of the loops which are between the platens and the product.

References Cited by the Examiner

UNITED STATES PATENTS

| 2,136,730 | 11/38 | Sweetland. | |
|---|---|---|---|
| 2,424,558 | 7/47 | Delano | 100—93 |
| 2,602,960 | 7/52 | Fischbein | 100—93 |

FOREIGN PATENTS

| 665,275 | 1/52 | Great Britain. |

EARL M. BERGERT, *Primary Examiner.*

UNITED STATES PATENT OFFICE
CERTIFICATE OF CORRECTION

Patent No. 3,185,073                                              May 25, 1965

Carroll H. Van Hartesveldt et al.

It is hereby certified that error appears in the above numbered patent requiring correction and that the said Letters Patent should read as corrected below.

Column 2, line 49, for "source" read -- course --.

Signed and sealed this 21st day of December 1965.

(SEAL)
Attest:

ERNEST W. SWIDER                                    EDWARD J. BRENNER
Attesting Officer                                   Commissioner of Patents